United States Patent
Buehrer et al.

[19]

[11] Patent Number: 6,157,847
[45] Date of Patent: Dec. 5, 2000

[54] BASE STATION SYSTEM INCLUDING PARALLEL INTERFERENCE CANCELLATION PROCESSOR

[75] Inventors: R. Michael Buehrer, Morristown; Mark D. Hahm, Mt. Arlington; Shang-Chieh Liu, Dover; Steven P. Nicoloso, Parsippany, all of N.J.

[73] Assignee: Lucent Technologies Inc., Murray Hill, N.J.

[21] Appl. No.: 09/342,145

[22] Filed: Jun. 29, 1999

[51] Int. Cl.[7] .............................. H04M 1/00; H04B 15/00
[52] U.S. Cl. ...................... 455/561; 455/63; 455/278.1; 455/296
[58] Field of Search ...................... 455/561, 103, 455/63, 296, 303, 272, 273, 278.1, 307; 375/346, 349

[56] References Cited

U.S. PATENT DOCUMENTS

| 6,038,272 | 3/2000 | Golden et al. ........................... 455/561 |
| 6,070,090 | 3/2000 | Feuerstein ............................... 455/561 |

*Primary Examiner*—Nguyen Vo

[57] ABSTRACT

The base station system includes a cancellation processor connected to a plurality of conventional signal processors. Under the control of a controller, the signal processors acquire user signals in signals received by the base station antennas. The controller controls the cancellation processor to perform cancellation operations with respect to the acquired user signals. The cancellation processor includes first-nth filter stages. Each filter stage operates in the same manner. A filter stage obtains, in parallel, the acquired user signals from signals supplied thereto by estimating symbols in the acquired user signals under the control of the controller. The cancellation processor also includes a cancellation stage associated with each filter stage. Each cancellation stage cancels, in parallel, the obtained user signals output from the associated filter stage from the signals received by the base station antennas. The resulting residual signals output from a cancellation stage are supplied to the next filter stage, and the signals supplied to the first filter stage are the signals received by the base station antennas. A cancellation stage cancels the obtained user signals received thereby from the received signals at a substantially same time with respect to the received signals.

33 Claims, 5 Drawing Sheets

BASE STATION SYSTEM INCLUDING PARALLEL INTERFERENCE CANCELLATION PROCESSOR

BACKGROUND OF THE INVENTION

1. Field of the Invention

The present invention relates in general to code division multiple access (CDMA) communications systems and, more particularly, to an improved method of interference cancellation for CDMA communications system.

2. Description of Related Art

Multiple access communication techniques enable multiple users, such as mobile telephones, to share the same path, for example a radio channel, to communicate to one receiver or base station at the same time. Examples of multiple access techniques include frequency division multiple access (FDMA) wherein different users are assigned to different frequency bands of the channel, time division multiple access (TDMA) wherein different users are assigned to non-overlapping time slots of the channel, and code division multiple access (CDMA). In CDMA, different users are assigned unique spreading codes, commonly pseudorandom noise (PN) codes, which are high bandwidth bitstreams used to multiply a respective baseband signal before transmission. Multiplying a baseband signal by a spreading code increases the bandwidth of the signal by a factor known as the spreading gain to spread the baseband signal across the channel.

Upon receipt at the base station, each user's signal is separated and decoded by one of a plurality of processing units under the control of a controller. The controller instructs each of the processing units on which user signal to separate and decode. Each processing unit separates and decodes a user signal by first multiplying the total received signal by the complex conjugate of the desired user's spreading code. This removes the desired user's spreading code from the received signal or despreads the desired signal back to its original bandwidth and makes other users' signals look like high bandwidth noise. The despread signal, together with interference due to other users' signals, i.e., multiple access interference, is used to decode the desired user's transmitted bits, treating the interference as additive nose. The quality of reception at the base station can be substantially improved if the multiple access interference, rather than being treated as noise, is canceled from the received signal before decoding the desired user's signal.

To this end, interference cancellation (IC) techniques are employed to try to reduce multi-access interference in a CDMA receiver by estimating the interference due to other users and then subtracting the estimated interference from the received signal before the desired user's signal is decoded. A multistage or parallel interference canceler (PIC) consists of a number of concatenated stages which are usually identical to one another. The total received signal is passed to the first stage which makes tentative decisions as to the transmitted signals of all the users. While making a tentative decision on a particular user's signal, all other users' signals are treated as noise. For each user, an estimate of interference is obtained by respreading and combining the tentative signal decisions of all other users. The interference estimate is then subtracted from the received signal to form a "cleaner" signal for that user, which is passed to the next stage of interference cancellation. The next stage uses the cleaner signals for each user to again estimate and subtract interference. This is repeated for any desired number of stages with two to four stages being typical. Output signals from the final stage are used by a conventional CDMA decoder to make symbol decisions, i.e., to determine what symbols were in the received signal.

At each mobile telephone, bits of the user's signal can be modulated for example as binary phase-shift keying (BPSK) signals or a M-ary orthogonal signals (as in IS-95 North America CDMA standard) prior to spreading. With BPSK modulation, the baseband signal of a user takes the values +1 or −1 depending on whether the bit is a 0 or a 1. With M-ary orthogonal modulation, a group of $\log_2 M$ bits are mapped onto one of M Walsh codes, each Walsh code having M bits taking values −1 or +1. For example, M=64 in the uplink of IS-95 CDMA standard, so that 6 bits are modulated to one of 64 Walsh codes with each Walsh code being 64 bits long. All M codes are orthogonal to each other. Decoding a BPSK modulated signal after despreading involves integrating over the bit interval and hardlimiting the result. For M-ary orthogonal modulation, decoding is done by computing the correlations of the despread signal with all the M possible Walsh codes and determining the strongest among them.

FIGS. 1 and 2 illustrate a prior art parallel interference cancellation (PIC) arrangement for an IS-95-like CDMA system using M-ary orthogonal modulation with Walsh-Hadamard functions as symbol waveforms. FIG. 1 schematically shows a general architecture of an N-stage PIC 100. The carrier is removed from the received signal to obtain the complex baseband received signal r, which is the sum of all signals received from the K simultaneous telephones or users plus noise.

The output of each stage 102, 104, 106 of the PIC 100 is a set of estimates of all the users' received signals: $u_{1,n}$, $u_{2,n}$, ..., $u_{k,n}$, where lower case n is used to indicate the number of any stage and lower case k is used to indicate the number of any user. As shown in FIG. 2, signal $u_{k,n-1}$, which consists of user k's received signal plus an interference component, is used by the nth stage to reconstruct user k's received signal. One of k conventional decoders 108, 110, 112, coherent or non-coherent, for M-ary orthogonal CDMA signals are used to decide which one of the M Walsh functions or symbols was transmitted by the kth user. This decoder also performs the despreading operation by multiplying the input signal with the complex conjugate of the kth user's PN code.

The M-ary decoders 108, 110, 112 are followed by Walsh code generators 114, 116, 118 which produce the corresponding symbol waveforms so that a single symbol waveform is used for reconstruction of each symbol waveform. The reconstructed symbol waveform for the kth user is then respread by multiplying it with the kth user's PN code and scaled by the complex valued channel estimate $\hat{\alpha}_k$ to obtain the reconstructed user k's baseband received signal. For the kth user, the interfering signals from all other users thus reconstructed are subtracted from the total received signal r to produce $u_{k,n}$. If the symbol decisions in the nth stage are sufficiently accurate, $u_{k,n}$ will have a lower interference component than $u_{k,n-1}$. In general, the amount of interference reduced in the nth stage will depend on the correctness of symbol decisions in that stage.

The received baseband signal r is given to all the inputs for the first stage. The outputs of the Nth stage are used by conventional M-ary decoders 120, 122, 124 such as the ones described above to make final symbols decisions for each user.

It should be understood, however, that operations performed by each stage in the PIC 100 must be completed before the receipt of the next symbol in the received signal.

Consequently, the processing speed of the processor implementing the PIC 100 must be extremely fast; and therefore, costly. If the need for such a memory was eliminated using a direct, hardwired implementation of FIG. 2, then the resulting, extremely complex, circuit would have inordinately high power consumption.

SUMMARY OF THE INVENTION

The base station system according to the present invention includes a cancellation processor connected to a plurality of conventional signal processors. Under the control of a controller, the signal processors acquire user signals in signals received by the base station antennas. Also, under the control of the controller, the cancellation processor performs cancellation operations with respect to the acquired user signals.

The cancellation processor includes first-Nth filter stages. Each filter stage operates in the same manner. A filter stage obtains, in parallel, the acquired user signals from signals supplied thereto by estimating symbols in the acquired user signals. A cancellation stage is associated with each filter stage, and cancels, in parallel, the obtained user signals output from the associated filter stage from the signals received by the base station antennas. The resulting residual signals output from a cancellation stage are supplied to the next filter stage, and the signals supplied to the first filter stage are the signals received by the base station antennas. Furthermore, a cancellation stage cancels the obtained user signals received thereby from the received signals at substantially the same time with respect to the received signals.

Because of the arrangement of the cancellation processor, conventional signal processors can be used in the base station system. Additionally, because the cancellation processor filters and cancels in parallel, the processor does not need to be an extremely fast and costly processor and does not require the use of extremely fast and costly memory.

BRIEF DESCRIPTION OF THE DRAWINGS

The present invention will become more fully understood from the detailed description given hereinbelow and the accompanying drawings which are given by way of illustration only, wherein like reference numerals designate corresponding parts in the various drawings, and wherein.

DETAILED DESCRIPTION OF THE PREFERRED EMBODIMENTS

Figure 1:
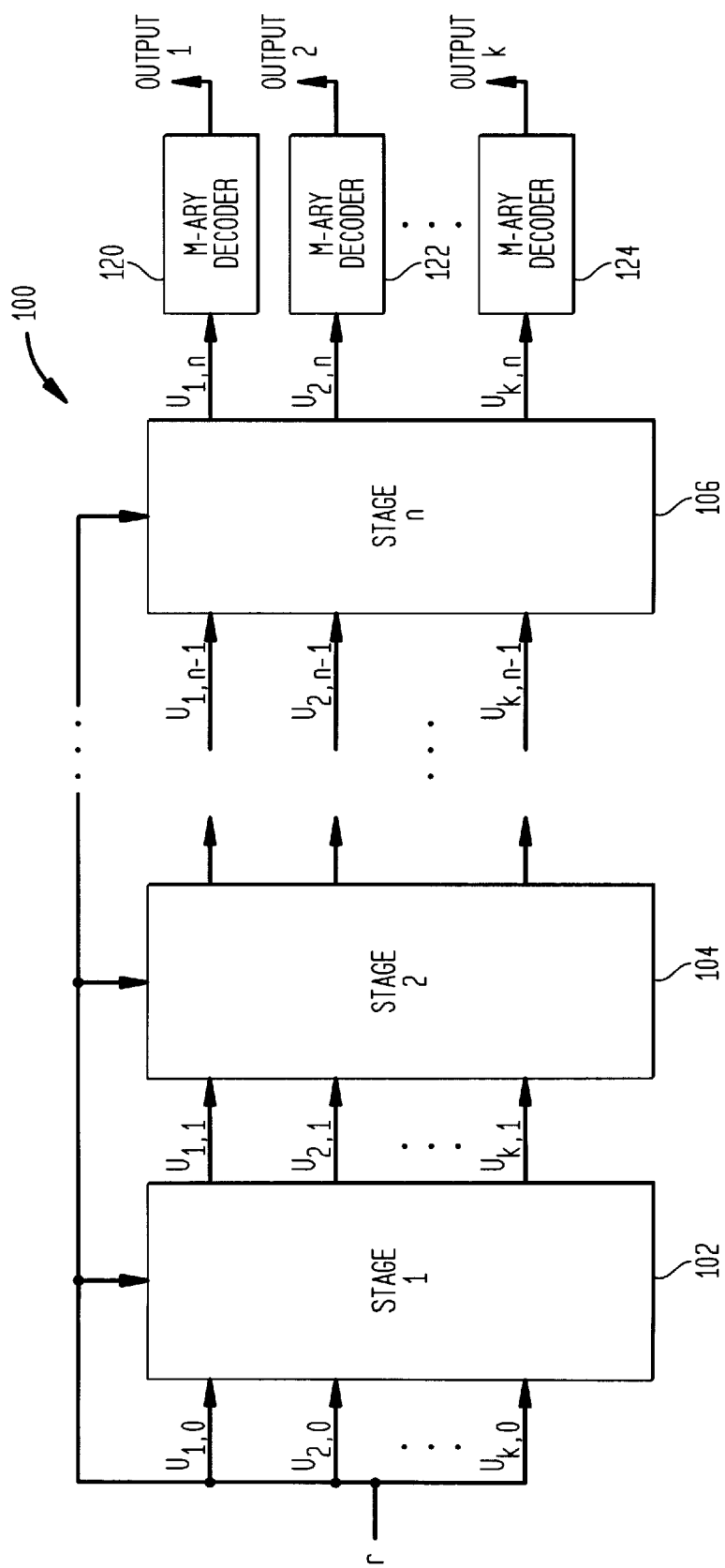
FIG. 1 is a schematic block diagram of a prior art parallel interference cancellation arrangement.
Figure 2:
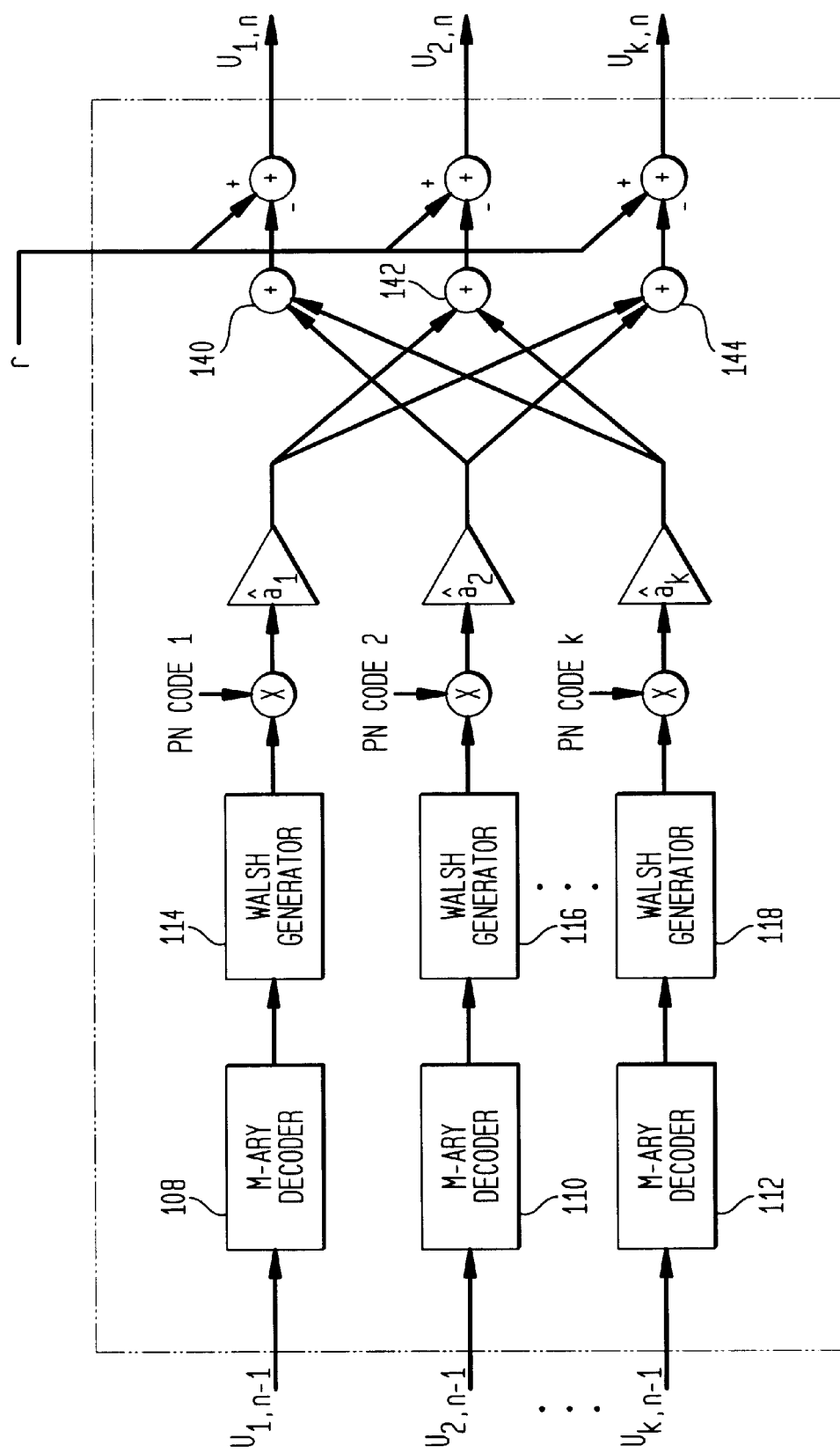
FIG. 2 is a schematic block diagram of an nth stage of the prior art parallel interference cancellation arrangement.
Figure 3:
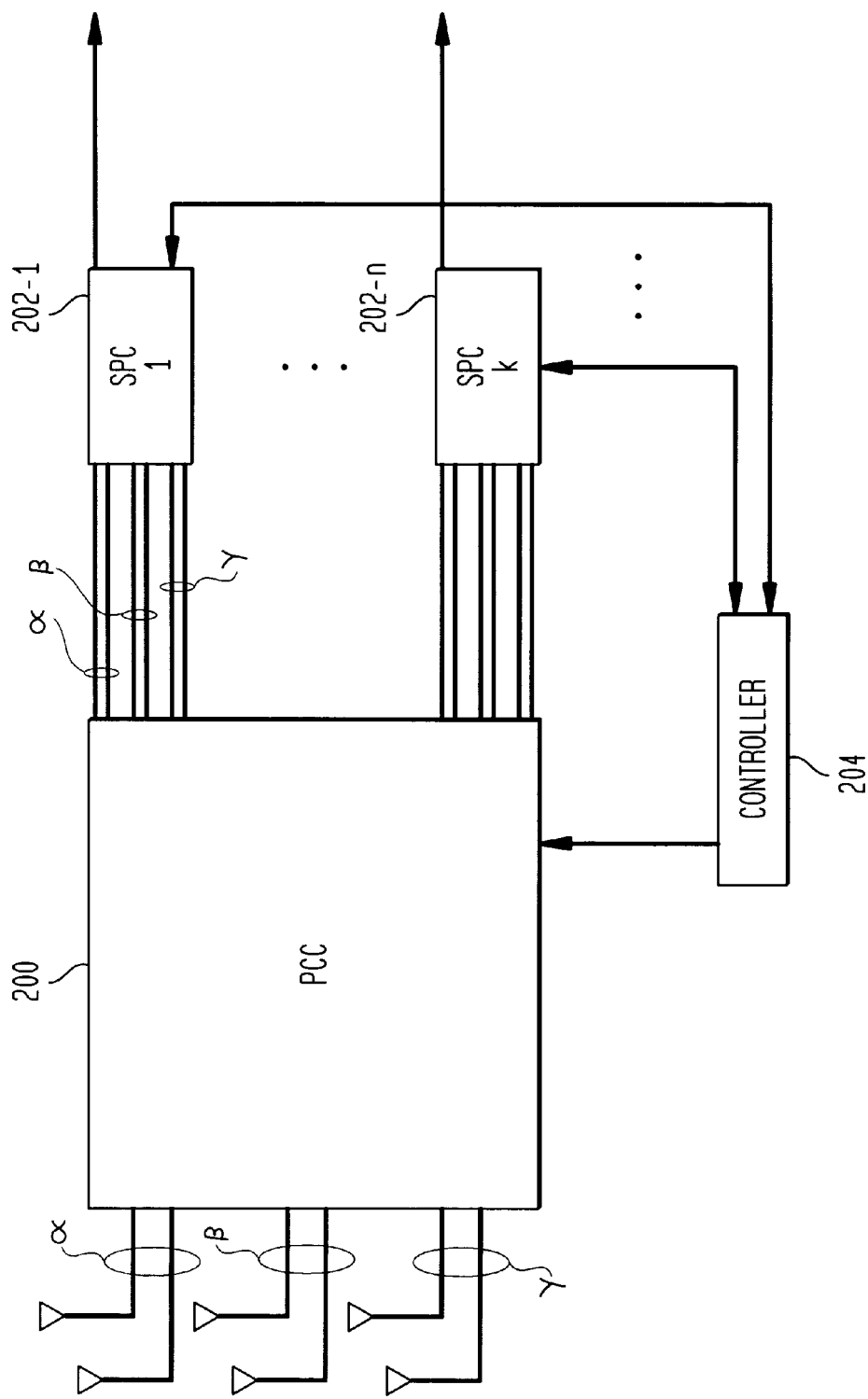
FIG. 3 illustrates a schematic block diagram of a portion of a base station processing system according to one embodiment of the present invention.

FIG. 3 illustrates a schematic block diagram of a portion of a base station processing system according to one embodiment of the present invention. As shown, first, second and third pairs of receive antennas $\alpha$, $\beta$ and $\gamma$ are connected to a parallel cancellation chip (PCC) 200.

First-kth signal processing chips (SPCs) 202-1 to 202-k are also connected to the PCC 200, and a controller 204 is connected to the PCC 200 and each of the first-kth SPCs 202-1 to 202-k.

The first-kth SPCs 202-1 to 202-k are any well-known signal processor for acquiring, separating and decoding a user signal. Specifically, the controller 204 selectively generates and supplies control signals to the first-kth SPCs 202-1 to 202-k depending on the number of users being serviced. The control signal provides an SPC 202 with a search window, timing of the search window, and a unique spreading code identifying a user signal. The timing of the search window indicates when an SPC 202 should search for the identified user signal, and the search window indicates how long to perform the search.

An SPC 202 receiving a control signal searches for the user signal identified in the received control signal based on the search window and search window timing. The search results are sent by the SPC 200 to the controller 204, which determines whether the SPC 202 has found the user signal. If found, the controller 204 sends the SPC 202 the timing of the user signal. The SPC 202 will then lock onto and acquire the user signal and perform the decoding operation.

The controller 204 supplies a control signal to the PCC 200 that identifies each of the acquired user signals and the timing information therefor. Prior to receiving this information for a particular user signal, the PCC 200 passes the signals received by the first, second and third pairs of antennas $\alpha$, $\beta$ and $\gamma$ unaltered to the first-kth SPCs 202-1 to 202-k. The PCC 200 performs a parallel cancellation operation with respect to each of the acquired user signals on the received signals, and supplies resulting signals to each of the first-kth SPCs 202-1 to 202-k. The operation of the PCC 200 will be described in more detail below with reference to FIGS. 4–5.

Figure 4:
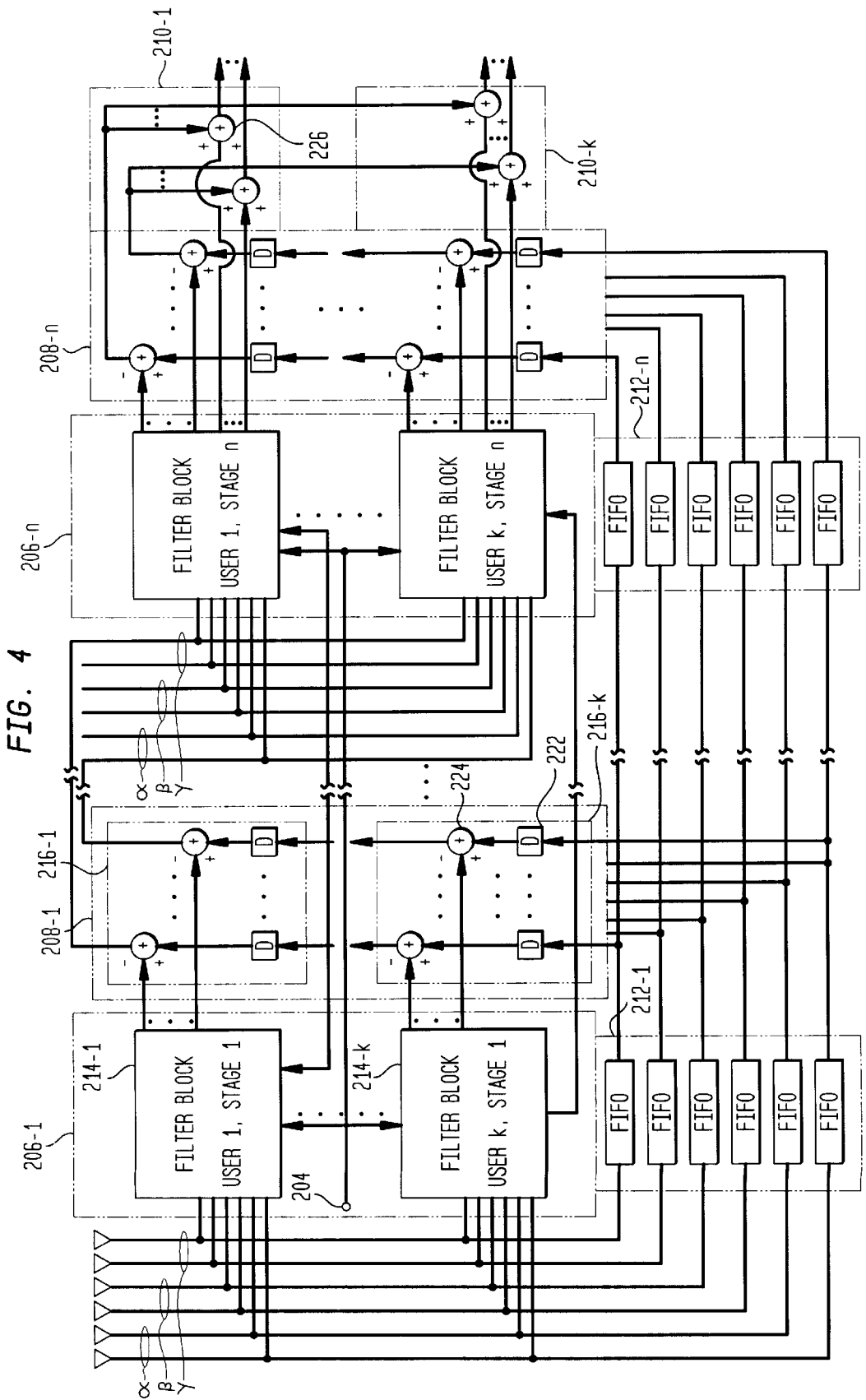
FIG. 4 illustrates a schematic block diagram of the PCC 200 illustrated in FIG. 3.

FIG. 4 illustrates a schematic block diagram of the PCC 200 illustrated in FIG. 3. As shown, the PCC 200 includes first-nth filter stages 206-1 to 206-n respectively connected to first-nth cancellation stages 208-1 to 208-n. And, the first-(n−1)th cancellation stages 208-1 to 208-(n−1) are connected to the second-nth filter stages 206-2 to 206-n. FIG. 4 shows that the second-nth filter stages 206-2 to 206-n receive output from the preceding filter stage 206. This output and its use by the successive filter stage 206 will be described in detail with respect to FIG. 5.

The PCC 200 also includes first-nth memory stages 212-2 to 212-n connected in series. The first filter stage 206-1 and the first memory stage 212-1 receive the signals on the first, second and third pairs of antennas $\alpha$, $\beta$ and $\gamma$, and the first-nth cancellation stages 208-1 to 208-n receive the output of the first-nth memory stages 212-1 to 212-n, respectively. Each of the first-nth memory stages 212-1 to 212-n includes a first-in first-out (FIFO) memory unit 220 associated with one of the antennas.

As further shown, each of the first-nth filter stages 206-1 to 206-n includes first-kth filter blocks 214-1 to 214-k connected in parallel, and each of the first-nth cancellation stages 208-1 to 208-n includes first-kth cancellation blocks 216-1 to 216-k connected in series. The first-kth filter blocks 214-1 to 214-k of each filter stage 206 and the first-kth cancellation blocks 216-1 to 216-k of each cancellation stage 208 are respectively associated with the first-kth SPCs 202-1 to 202-k.

The cancellation blocks 216 in each cancellation stage 208 have the same structure. Therefore, for the sake of brevity, only the structure of the kth cancellation block 216-k in the first cancellation stage 208-1 will be described. As shown, the kth cancellation block 216-k includes a delay 222, associated with each antenna, receiving the output of the FIFO 220, associated with the same antenna, in the first memory stage 212-1. A subtractor 224 is connected to each delay 222, and is, therefore, associated with one of the antennas in the first, second and third pairs of antennas α, β and γ. The subtractor 224 receives a signal, associated with the same antenna as the subtractor 224, from the kth filter block 214-k, and subtracts this signal from the output of the delay 222 connected thereto.

As shown, the delays 222 in each of the first-(k−1)th cancellation blocks 216-1 to 216-(k−1) are connected to associated subtractors 224 in the second-kth cancellation blocks 216-2 to 216-k, respectively. And, the second-nth filter stages 206-2 to 206-n receive the signals output from the first cancellation block 216-1 in the first-(n−1)th cancellation stages 208-1 to 208-(n−1).

The PCC 200 additionally includes first-kth adder blocks 210-1 to 210-k forming an adder stage. Each of the first-kth adder blocks 210-1 to 210-k receives a respective output of the first-kth filter blocks 206-1 to 206-k in the nth filter stage 206-n and the output of the first cancellation block 216-1 in the nth cancellation stage 208-n.

The adder blocks 210 have the same structure. Therefore, for the sake of brevity, only the structure of the kth adder block 210-k will be described. As shown, the kth adder block 210-k includes an adder 226, associated with each antenna. Each adder 226 receives an output signal, associated with the same antenna, from the kth filter block 214-k in the nth filter stage 206-n; and receives a signal, associated with the same antenna, from the first cancellation block 216-1 in the nth cancellation stage 208-n.

Figure 5:
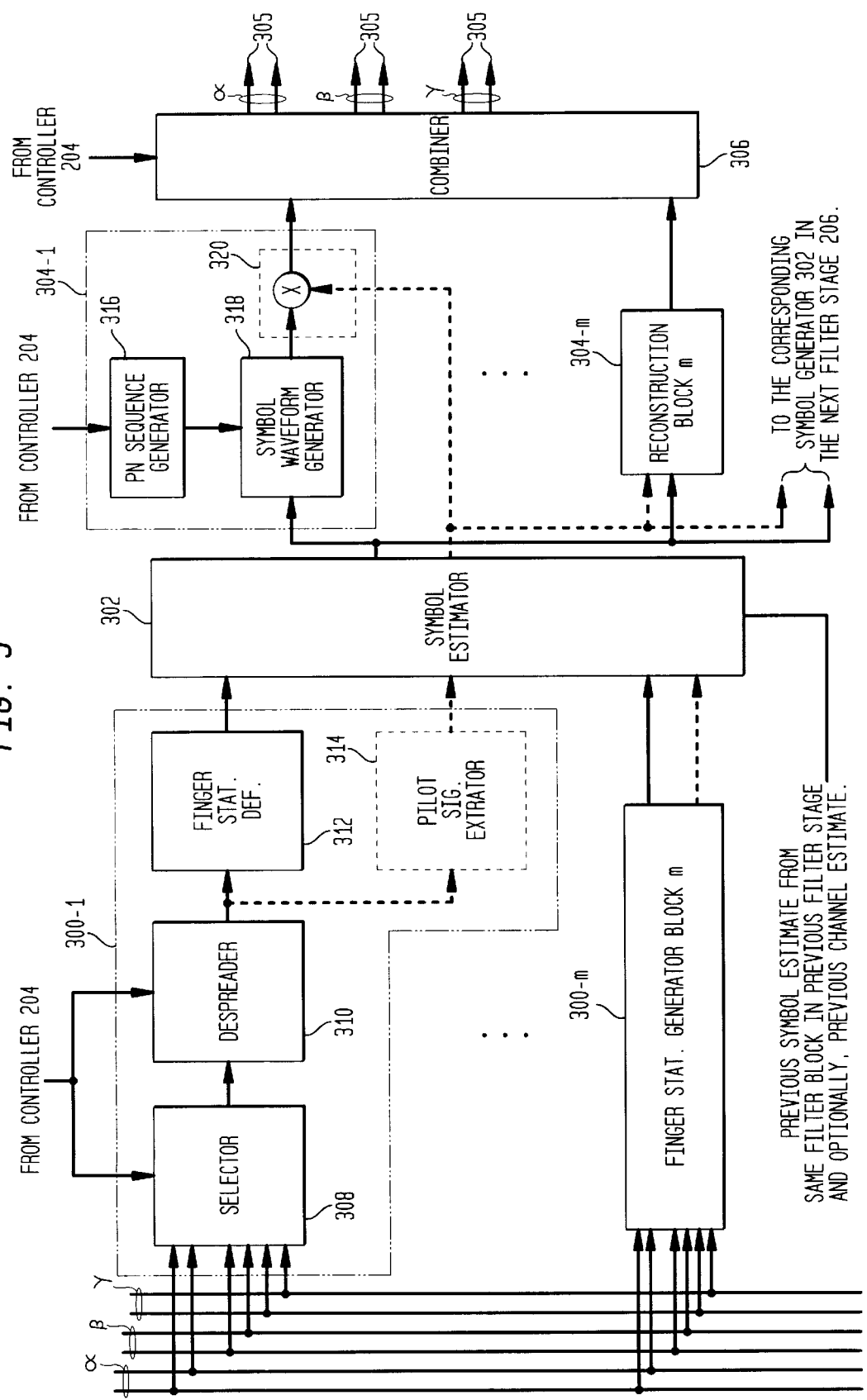
FIG. 5 illustrates a schematic block diagram of a filter block 214 illustrated in FIG. 4.

Next, the operation of the PCC 200 will be described with reference to FIGS. 4–5. The controller 204 supplies the identification information and timing of the user signal being processed by an SPC 202 to the filter blocks 214 in the filter stages 206 associated with the SPC 202. Accordingly, for example, the first filter block 214-1 in each filter stage 206 receives the same identification and timing information as the first SPC 202-1.

The filter blocks 214 in each filter stage 206 have the same structure and operation, which will be described in detail below. Briefly, however, a filter block 214 estimates the symbols in the identified user signal from the signals supplied thereto, reconstructs the identified user signal from the estimated symbols, and outputs the obtained user signal to an associated cancellation block 216.

Each memory stage 212 delays the signals received by the first, second and third pairs of antennas α, β and γ, by an amount associated with the processing time of a filter block 214. The processing performed by the kth filter block 214-k is timed and the delays 222 of the kth cancellation block 216-k delay the received signals from the memory stage 212 such that the subtractors 224 of the kth cancellation block 216-k receive the received signals and the obtained user signal from the kth filter block 214-k at the same time with respect to the received signals.

The cancellation result is output from the subtractors 224 to the delays 222 of the (k−1)th cancellation block 216-(k−1).

Similarly, the subtractors 224 in the successive (k−1)th to first cancellation blocks 216-(k−1)th to 216-1 cancel the obtained user signals from the (k−1)th to the first filter blocks 216-(k−1) to 216-1 at the same time with respect to the received signals. The output of the subtractors 224 of the first cancellation block 216-1 is a residual signal having had the obtained user signals cancelled therefrom. It should be remembered that unacquired user signals will remain in the residual signal until acquired by one of the SPCs 202.

From the description above, it should be understood, that the cancellation blocks 216 perform cancellation operations in parallel. And, at a given processing time, each cancellation block 216 cancels an obtained user signal from the received signals at a different instant in time with respect to the received signals. But, the timing of each filter block's processing, the length of the memory units 212 and the delay of the delays 222 are set such that the subtractors 224 of a cancellation block 216 receive the obtained user signal and the output from the previous cancellation block 216 (or, in the case of the kth cancellation block 216, the memory stage 212) so that cancellation occurs at the same point in time with respect to the received signals.

The first-kth filter blocks 214-1 to 214-k of the nth filter stage 206-n include a delay unit (not shown) which delays the obtained user signal by a predetermined period of time. The predetermined period of time is set such that the first-kth adder blocks 210-1 to 210-k receive the obtained user signals from the delay units of the first-kth filter blocks 214-1 to 214-k at the same instant in time with respect to the received signals as the first-kth adder blocks 210-1 to 210-k receive the residual signal from the first cancellation block 216-1 of the nth cancellation stage 208-n. The adders 226 in the first-kth adder blocks 210-1 to 210-k add the received signals to generate the signals supplied to the first-kth SPCs 202-1 to 202-k, respectively. It should be understood that the first-kth SPCs 202-1 to 202-k can not, and need not, distinguish between the signals generated by the first-kth adder blocks 210-1 to 210-k and the signals received by the first, second and third antennas α, β and γ.

Next, the structure and operation of a filter block 214 will be described with respect to FIG. 5. As shown in FIG. 5, first-mth finger statistic generator (FSG) blocks 300-1 to 300-m receive the signal from the first, second and third pairs of antennas α, β and γ. The number m of finger statistic generator blocks 300 corresponds to the number of fingers being processed by the filter blocks 214, and is a design constraint chosen by the system designer. It will be understood, that the arrangement of FIG. 5 applies to the first-kth filter blocks 214-1 to 214-k of the first filter stage 206-1. This arrangement also applies to the filter blocks 214 in the secondnth filter stages 206-2 to 206-n, except the first-mth FSG blocks 300-1 to 300-m therein receive the residual signals associated with the first, second and third pairs of antennas α, β and γ.

A symbol generator 302 is connected to the first-mth FSG blocks 300-1 to 300-m, and receives symbol estimates, and optionally channel estimates, from the same filter block 214 in the previous filter stage 206. First-mth reconstruction blocks 304-1 to 304-m receive the output of the symbol generator 302. A combiner 306 receives the output of the first-mth reconstruction blocks 304-1 to 304-m, and generates reconstructed signals.

The structure of each FSG block 300 is the same. As shown in FIG. 5, each FSG block 300 includes a selector 308 receiving the signals from the first, second and third pairs of antennas α, β and γ (or the residual signals associated therewith) and the control signal from the controller 204. A despreader 310 receives the output of the selector 308 and the control signal from the controller 204, and a finger statistic determiner 312 receives the output of the despreader 310. Optionally, a pilot signal extractor 314 also receives the output of the despreader 310.

The structure of each reconstruction block 304 is the same. As shown in FIG. 5, each reconstruction block includes a pseudo-random noise (PN) generator 316, which receives the control signal from the controller 204, and a symbol waveform generator 318 connected to the PN sequence generator 316. The symbol waveform generator 318 receives output from the symbol estimator 302. And, optionally, a multiplier 320 receives the output from the symbol waveform generator 318 and output from the symbol estimator 302. The output of the symbol waveform generator 318, or the multiplier 320, is supplied to the combiner 306.

The operation of the filter block 214 illustrated in FIG. 5 will now be described in detail. As discussed above, the control signal received by each filter block 214 from the controller 204 identifies a user signal for the filter block 214 to obtain. The information in the control signal identifying the user signal instructs the selector 308 on the signal from one of the first, second and third pairs of antennas α, β and γ to select. The selected signal is supplied to the despreader 310. Using the unique spreading code in this identification information, the despreader 310 multiplies the selected signal by the complex conjugate of the unique spreading code to despread the selected signal.

The finger statistic determiner 312 then determines a finger statistic from the despread selected signal. For example, the finger statistic determiner 312 performs a Fast Hadamard Transform to compute the complex valued correlations of the selected despread signal with the possible symbol values. The correlation results are sent to the symbol estimator 302.

Optionally, the FSG 300 includes a pilot signal separator 314, which separates the pilot signal from the selected despread signal and outputs the pilot signal to the symbols estimator 302.

The symbol estimator 302 estimates the symbols in the user signal identified by the control signal using the correlation results from each FSG 300. Specifically, each correlation result for a particular possible symbol from an FSG 300 is squared and added to the squared correlation results from the other FSGs 300 for the same possible symbol to produce a correlation sum for that possible symbol. Accordingly, the symbol estimator 302 produces a correlation sum associated with each of the possible symbol values for which correlation results were generated. The symbol estimators 302 in the second-nth filter stages also receive the symbol output from the symbol estimator 302 in the previous filter stage 206 and the correlation sum associated therewith. The correlation sum from the previous symbol estimator 302 is added to the correlation sum at the current symbol estimator 302 for the same symbol. The symbol estimator 302 outputs as the estimated symbol, the symbol associated with the maximum correlation sum.

It should be understood that the method of generating finger statistics and the method of estimating the symbols of the user signal are not limited to the methods described above. Instead, any well-known method could be used.

For instance, in an alternate embodiment, the symbol estimator 302 estimates the symbols in the user signal based on a channel estimate, which is the estimate of the distortion introduced by the physical channel. In the alternative embodiment, the FSGs 300 include pilot signal extractors 314 as described above. Using the pilot signals from the pilot signal extractors 314, the symbol estimator 302 generates a channel estimate, and generates the symbols estimate based on the channel estimate. U.S. application Ser. No. 09/296,654 entitled A METHOD OF CHANNEL ESTIMATION AND COMPENSATION BASED THEREON and U.S. application Ser. No. 09/296,409 entitled ITERATIVE CHANNEL ESTIMATION IN THE PRESENCE OF PILOT CHANNELS AND COMPENSATION BASED THEREON disclose methods of generating symbol estimates using channel estimates.

The PN sequence generator 316 in a reconstruction block 304 outputs the unique spreading code for the user signal to the symbol waveform generator 318 connected thereto based on the control signal from the controller 204. Each symbol waveform generator 318 in the first-mth reconstruction blocks 304-1 to 304-m receives the symbol estimate in addition to the unique spreading code, and produces a symbol waveform from the symbol estimate and the unique spreading code. For example, the symbol waveform generator 318 performs a Hadamard Walsh transform.

In the alternate embodiment discussed above, the symbol waveform from the symbol waveform generator 318 is multiplied with the channel estimate from the symbol estimator 302 by the multiplier 320, and the resulting waveform sent to the combiner 306. Otherwise, the symbol waveform is sent to the combiner 306. The combiner 306 adds the symbol waveforms from the reconstruction blocks 304 that are derived from the same antenna and outputs the resulting sum on an output line 305 associated with that antenna based on the identity information in the control signal from the controller 204. Because of the arrangement of the cancellation processor, conventional signal processors can be used in the base station system. Additionally, because the cancellation processor filters and cancels in parallel, the processor does not need to be an extremely fast and costly processor and does not require the use of extremely fast and costly memory.

What is claimed:

1. A base station system, comprising:
   a controller generating acquisition data for each user signal to be processed, and generating control information for said user signals to be processed, said acquisition data including identity information identifying a user signal to be processed and timing information for said user signal to be processed, said control information including said acquisition data for at least one of said user signals to be processed; and
   a plurality of signal processors, each signal processor acquiring a user signal from input signals based on said acquisition data received thereby, and estimating symbols in said acquired user signal; and
   a cancellation processor receiving a plurality of received signals and performing a cancellation operation on selected received signals based on said control information to generate said input signals.

2. The system of claim 1, wherein
   said controller, for a user signal to be processed, supplies initial information on said user signal to be processed to a selected one of said signal processors, said initial information including said identity information, a search window and timing of said search window for said user signal to be processed, receives search results from said selected signal processor, determines whether said selected signal processor has located said user signal to be processed, and generates said acquisition data for said selected signal processor if said user signal to be processed has been located; and
   said selected signal processor searches for said user signal to be processed based on said initial information, and sends said search results to said controller.

3. The system of claim 1, wherein
   said cancellation processor filters said received signals to obtain, in parallel, user signals identified in said control information, and uses said obtained users signals to perform said cancellation operation.

4. The system of claim 3, wherein said cancellation processor cancels, in parallel, each of said obtained user signals from said received signals to generate residual signals.

5. The system of claim 4, wherein said cancellation processor includes delays and performs said filtering such that said obtained user signals are canceled from said received signal at a substantially same time with respect to the received signals.

6. The system of claim 4, wherein said residual signals are added to ones of said obtained signals to generate said input signals.

7. The system of claim 1, wherein said cancellation processor comprises:

N filter stages, where N is an integer greater than 1, filtering signals supplied thereto to obtain, in parallel, user signals identified in said control information, a cancellation stage associated with each one of said N filter stages, for canceling said obtained user signals from said received signals to generate residual signals, and wherein a first filter stage of said N filter stages is supplied said received signals, and successive filter stages of said N filter stages receive said residual signal output from said cancellation stage associated with a previous filter stage of said N filter stages.

8. The system of claim 7, wherein said cancellation processor further comprises:

an adder stage for adding said residual signals output from said cancellation stage associated with an Nth filter stage of said N filter stages to said obtained user signals output from said Nth filter stage.

9. The system of claim 8, wherein output from said adder stage serves as said input signals.

10. The system of claim 7, wherein each of said N filter stages estimates symbols in each of said obtained user signals from said supplied signals, and generates each of said obtained user signals from said estimated symbols.

11. The system of claim 10, wherein each successive filter stage of said N filter stages receives said estimated symbols from said previous filter stage, and each successive filter stage estimates symbols in said obtained user signals from said supplied signals based in part on said estimated symbols from said previous filter stage.

12. The system of claim 10, wherein each of said N filter stages generates a channel estimate associated with each of said obtained signals, and estimates symbols in each of said obtained user signals from said supplied signals using said channel estimates.

13. The system of claim 12, wherein each successive filter stage of said N filter stages receives said channel estimates and said estimated symbols from said previous filter stage, and each successive filter stage estimates symbols in said obtained user signals from said supplied signals based in part on said channel estimates and said estimated symbols from said previous filter stage.

14. The system of claim 7, wherein each of said N filter stages includes first-kth filter blocks, each said acquisition data in said control information being received by one of said first-kth filter blocks, and each of said first-kth filter blocks filtering said supplied signals to generate, as said obtained user signal, a user signal identified by said acquisition data received thereby; and each cancellation stage including first-kth delay blocks and first-kth cancellers, said first delay block delaying said received signals by a first predetermined time, said second-kth delay blocks delaying output of said first-(k−1)th cancellers by said first predetermined time, said first-kth cancellers canceling said obtained signals output by said first-kth filter blocks from output of said first-kth delay blocks, respectively.

15. The system of claim 14, wherein said first predetermined period of time is set such that said first-kth cancellers cancel said obtained user signals at a substantially same time with respect to said received signals.

16. The system of claim 14, wherein said first-kth filter blocks in at least one of said N filter stages performs said filtering in parallel; and said first-kth cancellation blocks in at least one of said N cancellation stages cancels said obtained user signals received thereby from said received signals in parallel.

17. The system of claim 16, wherein each of said first-kth cancellation blocks performing said canceling in parallel cancels said obtained user signals received thereby from said received signals at a substantially same time with respect to said received signals.

18. The system of claim 7, wherein each of said cancellation stages cancels said obtained user signals received thereby from said received signals at a substantially same time with respect to said received signals.

19. The system of claim 18, wherein each of said cancellation stages cancels said obtained user signals received thereby from said received signals in parallel.

20. The system of claim 7, further comprising:

N memories connected in series, each of said N memories storing data for a first predetermined of time, a first of said N memories receiving said received signals;

each of said cancellation stages receiving output from a respective one of said N memories.

21. The system of claim 20, wherein said first predetermined period is set, and said cancellation stages include delays, such that each of said cancellation stages cancels said obtained user signals received thereby from said received signals at a substantially same time with respect to said received signals.

22. The system of claim 21, wherein each of said cancellation stages cancels said obtained user signals received thereby from said received signals in parallel.

23. The system of claim 7, wherein each of said cancellation stages cancels said obtain user signals received thereby from said received signals in parallel.

24. A cancellation processor, comprising:

N filter stages, where N is an integer greater than 1, filtering signals supplied thereto to obtain, in parallel, user signals identified in control information received thereby, said control information including acquisition data for at least one user signal, each said acquisition data including identity information identifying a user signal to be processed and timing information for said user signal to be processed;

a cancellation stage associated with each one of said N filter stages, for canceling said obtained user signals from said received signals to generate residual signals;

a first filter stage of said N filter stages being supplied said received signals, and successive filter stages of said N filter stages receiving said residual signal output from said cancellation stage associated with a previous filter stage of said N filter stages;

each of said N filter stages including first-kth filter blocks, each said acquisition data in said control information being received by one of said first-kth filter blocks, and each of said first-kth filter blocks filtering said supplied signals to generate, as said obtained user signal, a user signal identified by said acquisition data received thereby; and each cancellation stage including first-kth delay blocks and first-kth cancellers, said first delay block delaying said received signals by a first predetermined time, said second-kth delay blocks delaying output of said first-(k−1)th cancellers by said first predetermined time, said first-kth cancellers canceling said obtained signals output by said first-kth filter blocks from output of said first-kth delay blocks, respectively.

25. The system of claim 24, wherein said first predetermined period of time is set such that said first-kth cancellers cancel said obtained user signals at a substantially same time with respect to said received signals.

26. The system of claim 24, wherein each of said cancellation stages cancels said obtained user signals received thereby from said received signals at a substantially same time with respect to said received signals.

27. The system of claim 26, wherein each of said cancellation stages cancels said obtained user signals received thereby from said received signals in parallel.

28. The system of claim 24, further comprising:

N memories connected in series, each of said N memories storing data for a second redetermined of time, a first of said N memories receiving said received signals;

each of said cancellation stages receiving output from a respective one of said N memories.

29. The system of claim 28, wherein said first and second predetermined periods of time are set such that each of said cancellation stages cancels said obtained user signals received thereby from said received signals at a substantially same time with respect to said received signals.

30. The system of claim 29, wherein each of said cancellation stages cancels said obtained user signals received thereby from said received signals in parallel.

31. The system of claim 24, wherein each of said cancellation stages cancels said obtain user signals received thereby from said received signals in parallel.

32. The system of claim 24, wherein said first-kth filter blocks in at least one of said N filter stages performs said filtering in parallel; and said first-kth cancellation blocks in at least one of said N cancellation stages cancels said obtained user signals received thereby from said received signals in parallel.

33. The system of claim 32, wherein each of said first-kth cancellation blocks performing said canceling in parallel cancels said obtained user signals received thereby from said received signals at a substantially same time with respect to said received signals.

* * * * *